(12) United States Patent  
Degawa et al.

(10) Patent No.: US 7,506,678 B2
(45) Date of Patent: Mar. 24, 2009

(54) ADHESIVE TAPE JOINING APPARATUS (75) Inventors: Osamu Degawa, Osaka (JP); Masakazu Morimoto, Osaka (JP); Shinsuke Ikishima, Osaka (JP)

(73) Assignee: Nitto Denko Corporation, Osaka (JP)

( * ) Notice: Subject to any disclaimer, the term of this patent is extended or adjusted under 35 U.S.C. 154(b) by 581 days.

(21) Appl. No.: 11/392,809

(22) Filed: Mar. 30, 2006

(65) Prior Publication Data

US 2006/0219367 A1    Oct. 5, 2006

(30) Foreign Application Priority Data

Apr. 1, 2005 (JP) ............................... 2005-106290
Feb. 28, 2006 (JP) ............................... 2006-052794

(51) Int. Cl.
*B32B 37/22* (2006.01)
*B32B 38/10* (2006.01)

(52) U.S. Cl. .................... 156/391; 156/71; 156/247; 156/574

(58) Field of Classification Search .................. 156/71, 156/247, 391, 486, 574, 577, 579
See application file for complete search history.

(56) References Cited

U.S. PATENT DOCUMENTS

| 6,508,287 B1 | 1/2003 | Shinozaki et al. | |
| 6,585,023 B2 * | 7/2003 | Azuhata | 156/574 |
| 6,601,630 B2 * | 8/2003 | Kang | 156/574 |
| 6,698,489 B1 * | 3/2004 | Shinozaki et al. | 156/574 |
| 6,748,993 B1 * | 6/2004 | Shinozaki et al. | 156/391 |
| 6,796,351 B1 * | 9/2004 | Maeda | 156/391 |
| 7,152,651 B2 * | 12/2006 | Fujiwara | 156/574 |
| 7,234,499 B2 * | 6/2007 | Fujino | 156/391 |
| 7,287,567 B2 * | 10/2007 | Fujiwara | 156/391 |

FOREIGN PATENT DOCUMENTS

| JP | 2000-238958 A1 | 9/2000 |
| JP | 2001-115117 | 4/2001 |
| JP | 2001-171570 A1 | 6/2001 |
| JP | 2001-328573 A1 | 11/2001 |

* cited by examiner

*Primary Examiner*—Mark A Osele
(74) *Attorney, Agent, or Firm*—Cheng Law Group PLLC (57) ABSTRACT

A main body to be moved and operated along a workpiece includes a joining roller which elastically presses the supplied adhesive tape against a tape joining face of the workpiece, guide members which determine the position of the main body and maintain the posture of the main body with respect to the workpiece being engaged with the outer face of the workpiece at the opposite side of the tape joining face, a separator guide which is arranged to be opposed to a tape supply roller, and a tape guide which is arranged in the vicinity of the side where the adhesive tape is reeled out toward the separator guide. On the separator guide, a separator guide face is formed, which guides a separator st separated from the adhesive tape into a direction different from an adhesive tape joining direction.

20 Claims, 12 Drawing Sheets

ADHESIVE TAPE JOINING APPARATUS

BACKGROUND OF THE INVENTION (1) Field of the Invention

The present invention relates to an adhesive tape joining apparatus used when an adhesive tape is joined to a curved workpiece such as a door sash of an automobile.

(2) Description of the Related Art

In recent years, in a manufacturing process of an automobile, in place of black coating processing on a door sash, a technology to join a black adhesive tape has been developed. As this joining technology, an adhesive tape joining apparatus (an adhesive tape joining jig) has been suggested. Herein, an adhesive tape from which a separator is separated is elastically pressed against a tape joining face with a joining roller to be joined thereto while guiding and moving this adhesive tape joining apparatus on hand along a workpiece (refer to JP-A 2001-115117).

This adhesive tape joining apparatus (adhesive tape joining jig) is provided with four bottom guide rollers to be engaged on back and forth and right and left of a bottom face that is a tape joining face of the workpiece and four side guide rollers to be engaged on back and forth two places of the right and left side faces of the workpiece at its base. In addition, a single pressing roller to be elastically pressed against the upper face of the workpiece is mounted on a pressing lever that is pivotally connected to the base. Then, a bottom guide roller group and the pressing roller sandwich the workpiece vertically so as to hold the posture of the adhesive tape joining apparatus with respect to the workpiece. At the same time, by engaging the side guide rollers from right and left of the workpiece, positioning in a right and left direction of the adhesive tape joining apparatus with respect to the workpiece has been made.

Thus, moving the adhesive tape joining apparatus of which position and posture are determined along the workpiece due to the guidance of engagement by the roller group, the adhesive tape is elastically pressed against the bottom of the workpiece by an elastic roller arranged at the rear end of the base to be joined thereto. In addition, the adhesive tape to be supplied is curved and guided ahead of the elastic roller. In this case, the separator is separated to be fed forward in a joining moving direction through a gap formed between the base and a sliding plate.

However, the conventional apparatus has the following problems.

In other words, the suggested adhesive tape joining apparatus employs guiding means using four bottom guide rollers to be engaged with the bottom face of the workpiece and two pairs of side guide rollers that are engaged with the right and left side faces of the workpiece, respectively, so that there are many engagement guide operational places. Therefore, a function to hold the posture of the adhesive tape joining apparatus and a function to determine the position thereof with respect to the workpiece are sophisticated. These functions can be sufficiently practiced for a linear workpiece. However, the elastic roller to press the adhesive tape against the tape joining face is arranged at a rear part of the guide roller group, so that this involves a problem such that the appropriate joining is not performed to the workpiece having a curved part.

In other words, in the case that this adhesive tape joining apparatus is moved forward along a workpiece having a curved portion, when the guide roller group passes through, for example, the curved portion shaped in a mountain, the posture of the apparatus will be determined depending on the direction of the workpiece that is located over the curved portion. Therefore, since the elastic roller behind the guide roller group is located in front of the curved portion yet, the elastic roller will come close to the workpiece. Accordingly, in front of the curved portion, the elastic roller will be elastically transformed more than the normal case to be pressed against the tape joining face. As a result, the adhesive tape will be locally pressed by a large pressure and a stretch and a crease are generated on the adhesive tape.

In addition, there is a limit in the elastic transformation of the elastic roller, so that the apparatus cannot follow the sharp curve of the workpiece. In other words, the suggested adhesive tape joining apparatus can be effectively used for the workpiece having a linear or a gentle curved portion. However, this involves a problem such that the apparatus cannot continuously join the tape on the workpiece having a relatively sharp curved portion.

In addition, in the suggested adhesive tape joining apparatus, the separated separator is discharged forward in a joining moving direction of the adhesive tape joining apparatus. Therefore, in the case of carrying out the joining processing on the horizontally long bottom face of the workpiece, even if the separated separator moves forward in a moving direction of the adhesive tape joining apparatus, it is not obstructive to the forward moving because it hangs down downward by its own weight. However, in the case of performing the joining processing on the longitudinal directed place in the workpiece, the separator moved forward in the moving direction of the adhesive tape joining apparatus is obstructive to the forward moving. Accordingly, this involves a disadvantage such that the attention to the adhesive tape joining operation gets distracted due to the operation to wave aside the separator or the joining moving speed is lowered so as to deteriorate finish of joining.

SUMMARY OF THE INVENTION

The present invention has been made taking the foregoing problems into consideration and an object of which is to provide an adhesive tape joining apparatus that can carry out the adhesive tape joining processing with a high degree of accuracy with respect to the workpiece having the relatively sharp curved portion and can smoothly carry out the adhesive tape joining without being distracted by the separated separator.

In order to attain the aforementioned object, the present invention may comprise the following structure.

An adhesive tape joining apparatus which supplies an adhesive tape to a joining roller while moving forward along a workpiece and joins this adhesive tape on a tape joining face of the workpiece by pressing the adhesive tape against the tape joining face, the apparatus comprising:

a main body that is moved and operated along the tape joining face of the workpiece;

a joining roller which joins the supplied adhesive tape to the tape joining face of the workpiece by pressing the adhesive tape against the tape joining face and can be elastically transformed;

a tape supply roller which winds and guides the adhesive tape and introduces the tape to the joining roller;

a guide member which determines the position of the main body and keeps the posture of the main body with respect to the workpiece being engaged with the outer face of the workpiece at the opposite side of the tape joining face;

a separator guide arranged to be opposed to the tape supply roller, on which a separator guide face for guiding the separator separated from the adhesive tape to a direction different from the direction of joining the adhesive tape at a region where the tape of the tape supply roller is wound; and a tape guide for preventing disengagement of the tape that is arranged adjacent to the side from which the adhesive tape is reeled out toward the separator guide.

Since the adhesive tape joining apparatus is sandwiched by the guide member to be engaged with the outer face of the workpiece at the opposite side of the tape joining face and the joining roller, the adhesive tape joining apparatus is guided and held at a predetermined posture and a predetermined position with respect to the workpiece using the outer face of the workpiece as a reference face. In addition, the joining roller is opposed to the joining face of the workpiece at a predetermined elastic pressed state.

By moving the adhesive tape joining apparatus of which posture and crosswise position are secured as stated above along the workpiece, the adhesive tape is guided and supplied to the joining roller via the tape supply roller, and the adhesive tape pressed by the joining roller is continuously joined to the tape joining face of the workpiece. In addition, being wound around the tape supply roller, the adhesive tape turns around to be guided to the joining roller. The separator does not turn around into a direction other than the direction to which this adhesive tape is guided and the separator is separated at the region where the tape is wound to move toward a separator guide. Then, the separator is guided to the separator guide face to be released in a direction that is not obstructive to joining of the tape.

In addition, if joining is progressed to reach the curved portion of the workpiece, the guide member only engaged with the outer face of the workpiece moves along the outer face of the curved workpiece. In this case, the joining roller opposed to the guide member absorbs change of the aspect of the joining face by its elastic transformation. Therefore, the joining roller certainly follows the relatively large curve to continue joining of the tape.

As described above, according to this apparatus of the invention, it is possible to carry out the joining processing of the adhesive tape with respect to the workpiece having the curved portion with a high degree of accuracy with no stretch and no crease of the adhesive tape generated. In addition, without being distracted by the separated separator, the adhesive tape can be smoothly joined on the workpiece.

Further, it is preferable that the guide member is configured by two kinds of guide members that are engaged with the outer face of the workpiece across a rib protruded along the tape joining direction on the outer face of the workpiece.

According to this structure, separating the guide member from the joining roller and widening the space between the guide member and the joining roller, the workpiece can be easily put in this space. Then, by approaching the guide member to the joining roller to be held at a predetermined position, a predetermined guided state such that the guide member is engaged with the outer face of the workpiece has been brought. In addition, if the joining processing is progressed, separating the guide member from the joining roller, the adhesive tape joining apparatus can be set aside from the workpiece. Accordingly, attachment and detachment of the adhesive tape joining apparatus to and from the workpiece can be easily carried out.

In addition, it is preferable that one of the two kinds of guide members is configured by a single guide roller that pivotally moves along the outer face of the workpiece and the other guide member is configured by a guide block that slidably moves in a predetermined range on the outer face of the workpiece in the tape joining direction while contacting the predetermined range on the outer face of the workpiece.

According to this structure, effectively using a rib on the outer face of the workpiece for positioning of a crosswise direction, it is possible to certainly hold the posture and the lateral positioning of the adhesive tape joining apparatus with respect to the workpiece by a few guide members.

It is preferable that the guide block includes a pair of back and forth sliding guides which are divided in the tape joining direction.

According to this structure, when the guide block passes through the curved portion of the workpiece, the guide block can slidably pass with a pair of back and forth sliding guide faces in the guide block stably engaged with the convex outer face of the workpiece. Therefore, even in the workpiece that is relatively much curved, the tape joining processing can be smoothly carried out. In other words, a concave portion is formed between the divided pair of back and forth sliding guide faces, and the guide block slidably passes while putting a convex portion of the curved workpiece into this concave portion.

It is preferable that the joining roller further includes the pair of back and forth rollers, and respective joining rollers are arranged so as to be substantially opposed to each other on the faces of the pair of back and forth sliding guides provided to the guide block across the workpiece.

According to this structure, the back and forth sliding guide faces of the guide block always slidably contact the outer face of the workpiece that is a reference face to stably hold the adhesive tape joining apparatus. Therefore, the position with respect to the back and forth joining faces of the joining roller substantially opposed to this sliding guide faces is always stabled. Then, it is possible to join the supplied adhesive tape in the just enough elastic pressing state.

It is preferable that the separator guide face is formed on a concave curved face moving to the tape supply roller.

According to this structure, the separated separator will turn around and guided in a desired direction different from the joining direction by the concave and curved separator guide face. Therefore, it is more certainly avoided to move the separated separator forward of the apparatus. In addition, this makes the adhesive tape joining apparatus to effectively move forward without being distracted by the separated separator.

It is preferable that the separator guide and the tape guide are configured so that the movement can be adjusted in accordance with the width of the tape.

In addition, it is preferable that the apparatus may further comprise a tape guide for guiding running which is attached on the lower face of the main body, wherein a gap for inserting the adhesive tape is formed between the lower face of the main body and the guide with its one end released, the other end side is attached and fixed to the main body, and a positioning part slidably contacting one end of the adhesive tape in a longitudinal direction is formed at the back side of this other end, and the tape guide for guiding running is disposed at a position opposed to the positioning part so as to sandwich the adhesive tape from the width direction.

According to this structure, since the adhesive tape to be supplied is sandwiched by the positioning part and the tape guide from the width direction, the adhesive tape can be easily set and time for setting can be shortened. In addition, the running position of the adhesive tape is not misaligned, so that the running can be stabled.

It is preferable that the joining roller is configured by a pair of back and forth rollers, and the diameter of the roller at the front side in the moving direction is set to be larger than the diameter of the roller at the rear side.

According to this structure, since the contact face with the adhesive tape to be wound is enlarged, the adhesive tape can be stably joined. Further, by making the diameter of the roller larger, the separation position of the separator can be brought close to the joining face of the workpiece, so that it is possible to prevent adhesion of dust or the like on the tape joining face.

In order to attain the object, the present invention may adopt the following structure.

An adhesive tape joining apparatus which supplies an adhesive tape to a joining roller while moving forward along a workpiece and joins this adhesive tape to a tape joining face of the workpiece by pressing the adhesive tape against the tape joining face, the apparatus comprising:

a main body that is moved and operated along the tape joining face of the workpiece;

a joining roller which winds and guides the adhesive tape to be supplied, joins the supplied adhesive tape to the tape joining face of the workpiece by pressing the adhesive tape against the tape joining face, and can be elastically transformed, wherein the diameter of the roller at the front side in the moving direction is larger than the diameter of the roller at the rear side;

a guide member which determines the position of the main body and keeps the posture of the main body with respect to the workpiece being engaged with the outer face of the workpiece at the opposite side of the tape joining face;

a separator guide arranged to be opposed to the tape supply roller, on which a separator guide face for guiding the separator separated from the adhesive tape to a direction different from the direction of joining the adhesive tape at a region where the tape of the tape supply roller is wound; and a tape guide for preventing disengagement of the tape that is arranged adjacent to the side from which the adhesive tape is reeled out toward the separator guide.

The adhesive tape joining apparatus according to the present invention is configured in such a manner that the tape supply roller is omitted from the constituent features of the invention. Due to this structure, in addition to the aforementioned advantages of the invention, the following advantages may be realized.

In other words, during guiding the adhesive tape from the tape guide to the front side roller, the adhesive tape escapes from the effects of loose due to a rotation error between the tape supply roller and the front side roller or the like. In other words, it is possible to maintain a regular degree of a tension on the adhesive tape between the tape guide and the front side roller. As a result, the adhesive tape can be stably joined on the workpiece. In addition, since the running distance from the tape guide to the joining roller, it is possible to prevent adhesion of dust or the like on the adhesive tape after the separator is separated.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

An embodiment of the present invention will be described below with reference to the drawings.

Figure 1:
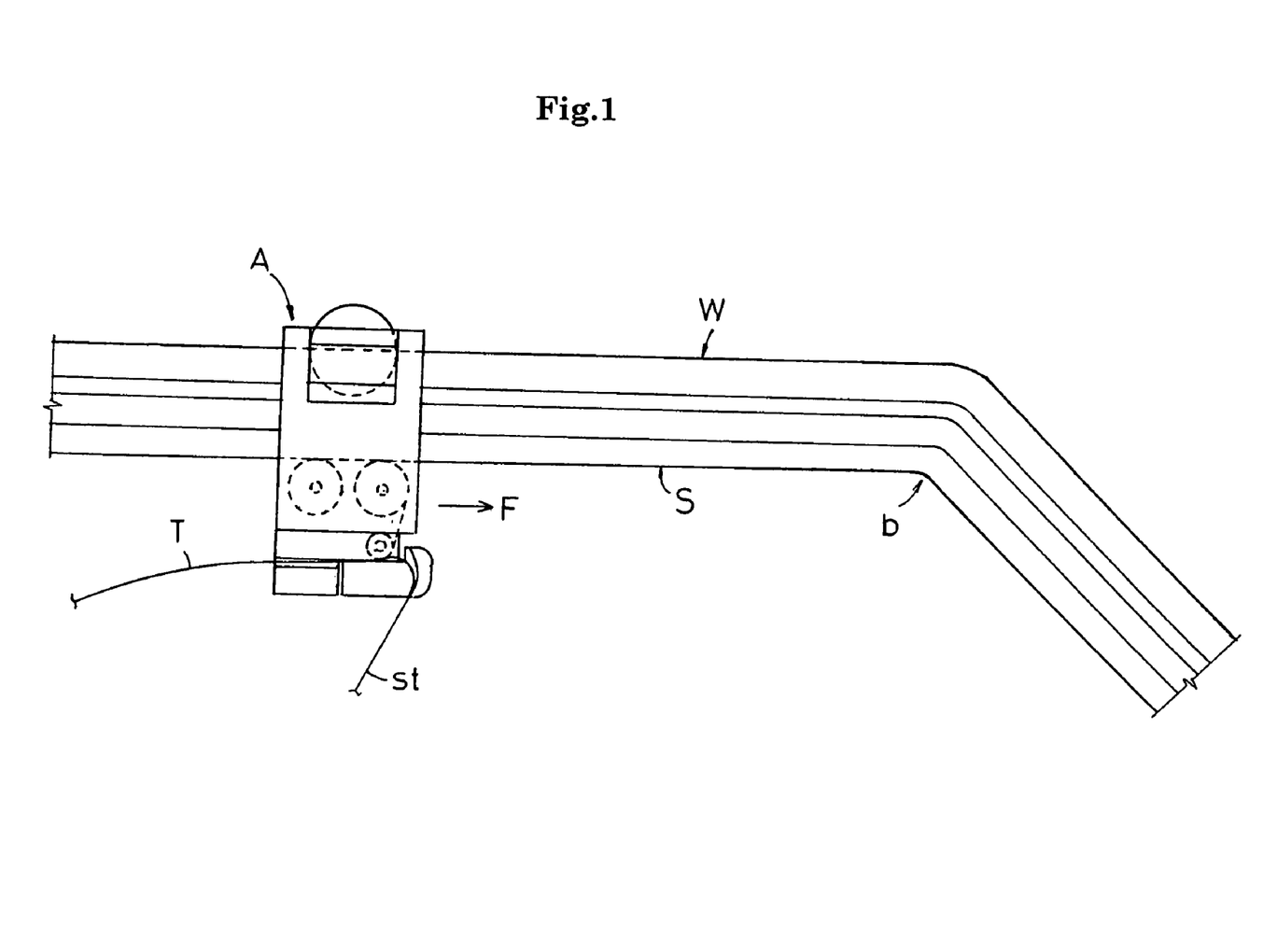
FIG. 1 is a side view showing the joining processing state using an adhesive tape joining apparatus according to the present invention.
Figure 2:
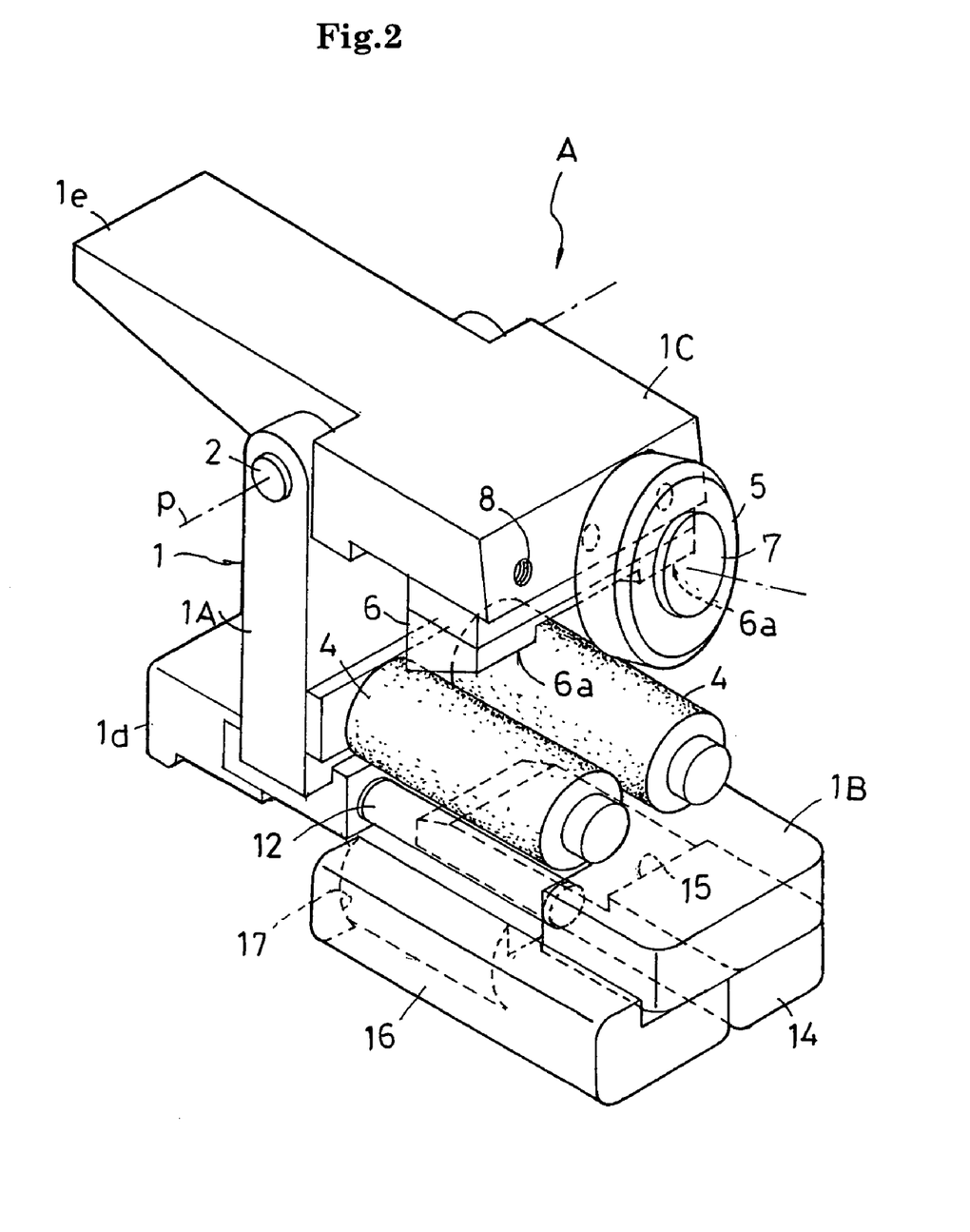
FIG. 2 is an outside perspective view of the adhesive tape joining apparatus.
Figure 3:
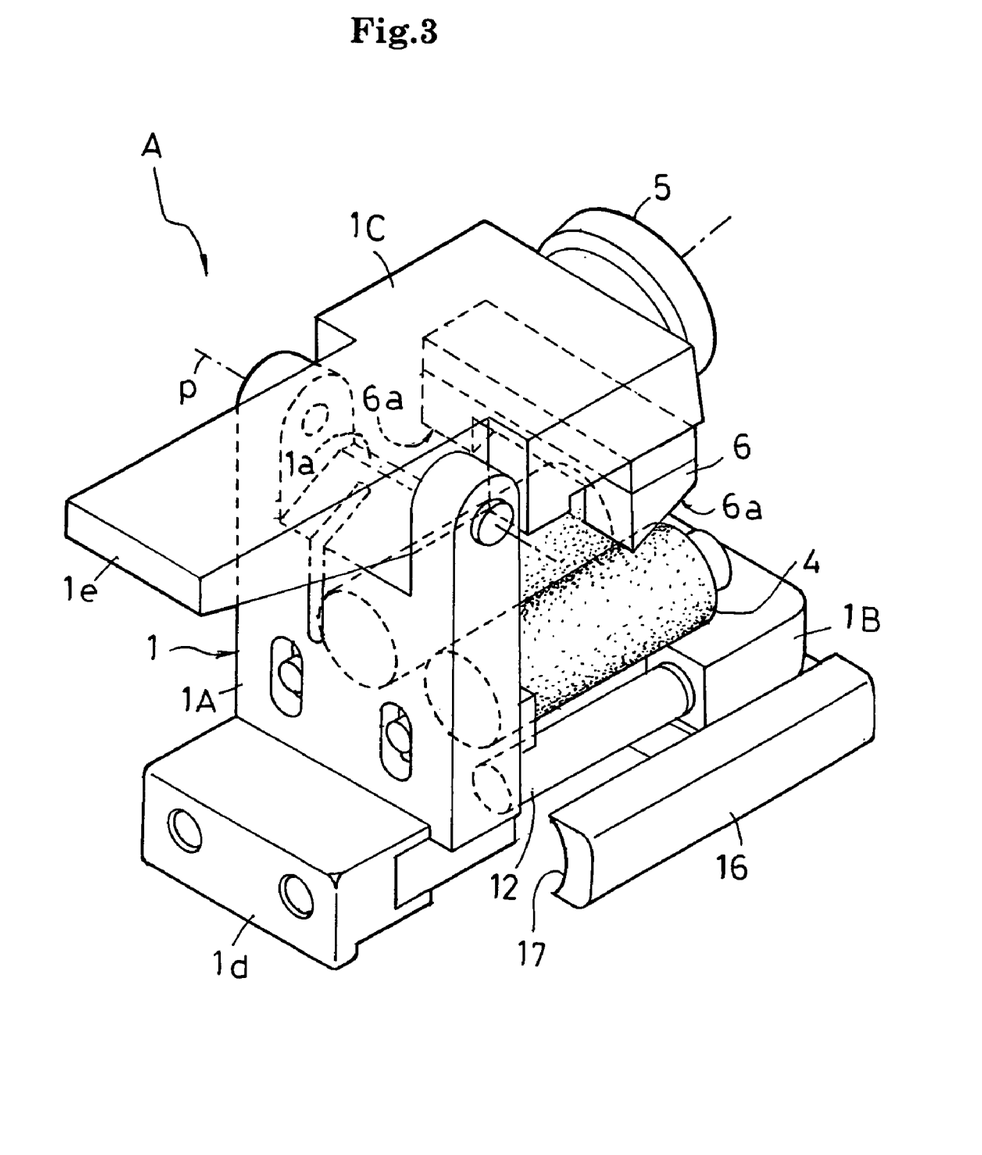
FIG. 3 is an outside perspective view of the adhesive tape joining apparatus seen from the different direction.
Figure 4:
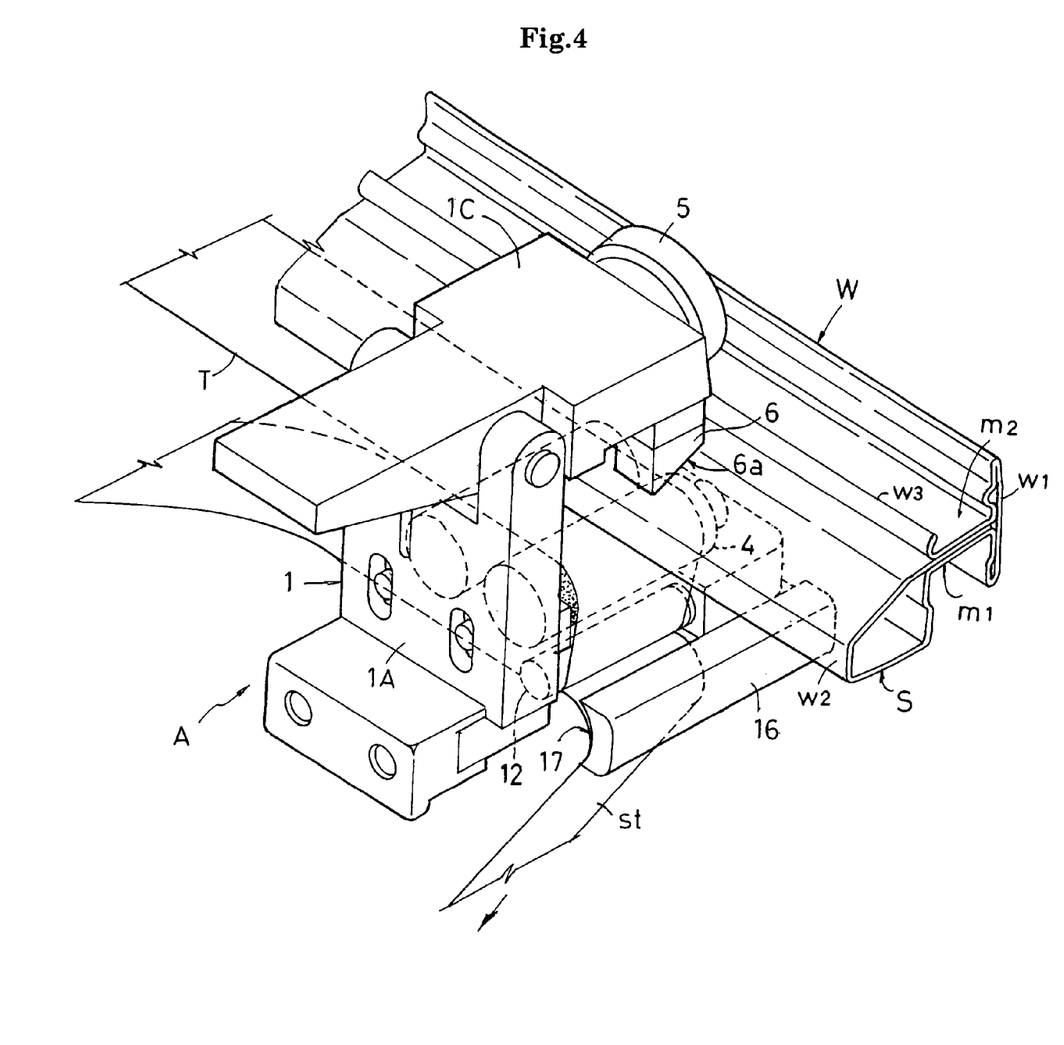
FIG. 4 is a perspective view of the joining processing state.
Figure 5:
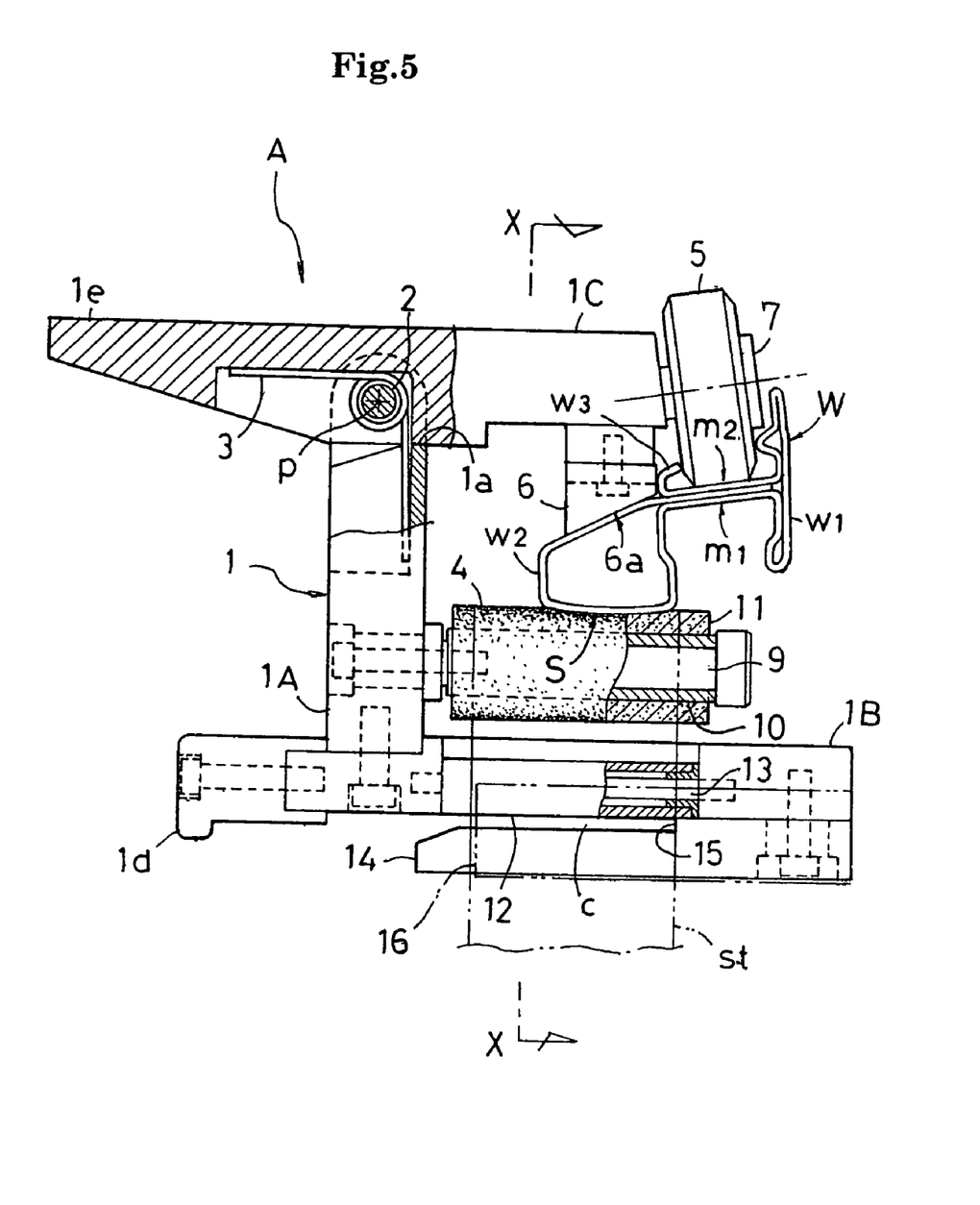
FIG. 5 is a front view having a part of the joining processing state cut.

FIG. 1 is a side view showing a step of joining an adhesive tape T on a curved workpiece W using an adhesive tape joining apparatus A according to the present invention. FIGS. 2 and 3 are outside perspective views of the adhesive tape joining apparatus A. FIG. 4 is a perspective view of the adhesive tape joining step. FIG. 5 is a front view of the joining step.

Further, the workpiece W according to the present embodiment is a door sash in an automobile, and an apparatus for joining a black adhesive tape to an inner circumferential face inside of the car side of this door sash in place of black coating will be described below.

The workpiece W, as shown in FIGS. 4 and 5, is configured by press polymerization of a single steel plate. This workpiece W has an outer frame $w_1$ shaped in a longitudinal wall at the lateral outside that is the outer face of the door, and the workpiece W is formed with a section that a hollow lateral frame $w_2$ thrusting from this outer frame $w_1$ toward the inside of the door (the left side in FIG. 5) is connected. Then, between a hollow region of the lateral frame $w_2$ and the outer frame $w_1$, a window glass mounting groove $m_1$ is formed. In addition, at right and left middle region of the outer face of the hollow lateral frame $w_2$ (the upper face in FIG. 5), a rib $w_3$ is protruded along the longitudinal direction of the workpiece. Between this rib $w_3$ and the outer frame $w_1$, a weather strip mounting groove $m_2$ is formed. Then, the inner face at the follow region at the lateral frame $w_2$ (the lower face in FIG. 5) becomes a tape joining face S. On this tape fasting face S, an adhesive tape T is joined by a manual fashion by using an adhesive tape joining apparatus A according to the present invention. As the adhesive tape T, an adhesive tape with a separator that is wider than the tape joining face S is used.

As shown in FIG. 1, the adhesive tape joining apparatus A may join the adhesive tape T being guided and engaged to the workpiece W while moving along the workpiece longitudinal direction by the manual labor. Accordingly, in the following description, as a matter of convenience, a direction F of joining and moving the adhesive tape joining apparatus A is called as a front direction, and a door inside direction that is perpendicular to the tape joining direction is called as a lateral direction or a right and left direction.

The main body 1 of the adhesive tape joining apparatus A is formed by a hard resin material. As shown from FIGS. 2 to 5, the main body 1 is configured by a first bracket 1A shaped in a block, a second bracket 1B that is coupled and fixed to be perpendicular to the lower end of this first bracket 1A, and a movable bracket 1C with a lever that is attached to the upper part of the first bracket 1A so as to be opposed to the second bracket 1B.

Here, the movable bracket 1C is pivotally connected to the upper part of the first bracket 1A via a support axis 2 to be capable of swinging around a back and forth directed support point p. In addition, as shown in FIG. 5, the movable bracket 1C is swingably biased downward by a twisting spring 3 externally fitted to the support axis 2. In other word, due to abutting of the first bracket 1A against a bottom face 1a at a pivotally supporting concave portion, the swinging and biasing of this movable bracket 1C is limited. In this limitation of the swinging and biasing, the movable bracket 1C is perpendicular to the first bracket 1A.

On the lateral side face of the lower part of the first bracket 1A, a pair of back and forth joining rollers 4 that can freely idle around a horizontal lateral axial core is mounted like a cantilever. In addition, on the lateral side face of the front end of the movable bracket 1C, as the guide member, a single guide roller 5 is mounted around the inclined lateral axial core of which end is slightly raised to freely idle. Further, on the lower face at the front end of the movable bracket 1C, as another guide member, a guide block 6 is attached.

The guide roller 5 is formed by a hard resin material excellent in smoothness, for example, fluorine contained resin. Then, this guide roller 5 is inserted till the bottom face of a weather strip mounting groove $m_2$ at the workpiece W to be engaged with the outer face of the lateral frame $w_2$.

The guide block 6 is also formed by a hard resin material excellent in smoothness. Then, a pair of back and forth sliding guide faces 6a formed to be inclined on the lower face of this guide block 6 contacts the inclined outer face of the lateral frame $w_2$ at its face to be engaged therewith. Thus, by engaging the guide roller 5 with the guide block 6 on a plurality of back and forth and right and left places on the outer face of the lateral frame $w_2$, the posture of the adhesive tape joining apparatus A with respect to the workpiece W is held at a predetermined posture. In addition, by sandwiching the rib $w_3$ between the lateral side face of the guide roller 5 and the lateral side face of the guide block 6 from right and left, the positioning in a lateral direction of the adhesive tape joining apparatus A with respect to the workpiece W is made.

Further, as shown in FIG. 2, at the lateral side face of the front end of the movable bracket 1C, three fitting holes 8 are formed in parallel in a back and forth direction to screw and mount a support axis 7 of the guide roller 5. By selecting this fitting hole 8, the position of the guide roller 5 can be adjusted back and forth in accordance with the workpiece W. In addition, as shown in FIG. 6, the guide roller 5 at a reference position that is attached by using the fitting hole 8 in the middle of the back and forth direction is located between the back and forth sliding guide faces 6a in the guide block 6.

As shown in FIG. 5, a joining roller 4 is configured by coating a tubular axis 10 externally fitted to a fixed core axis 9 to freely idle with an elastic layer 11 of a sponge type. In other words, the guide roller 5 and the guide block 6 of the movable bracket 1C located in the swinging limit posture are pressed against the tape joining face S of the workpiece W to be elastically transformed in moderation engaged with the workpiece W engaged at a predetermined position and a predetermined posture. Further, the fixed core axis 9 of the joining roller 4 is attached so that its position can be adjusted in an upper and lower direction.

At a front end of the second bracket 1B, a tape supply roller 12 is supported by an axis around a lateral axial core to freely idle so as to be opposed to the joining roller 4 at the front side in parallel. This tape supply roller 12 is formed by a hard resin material excellent in smoothness and it is supported by a fixed support axis 13 to be freely fitted.

Figure 6:
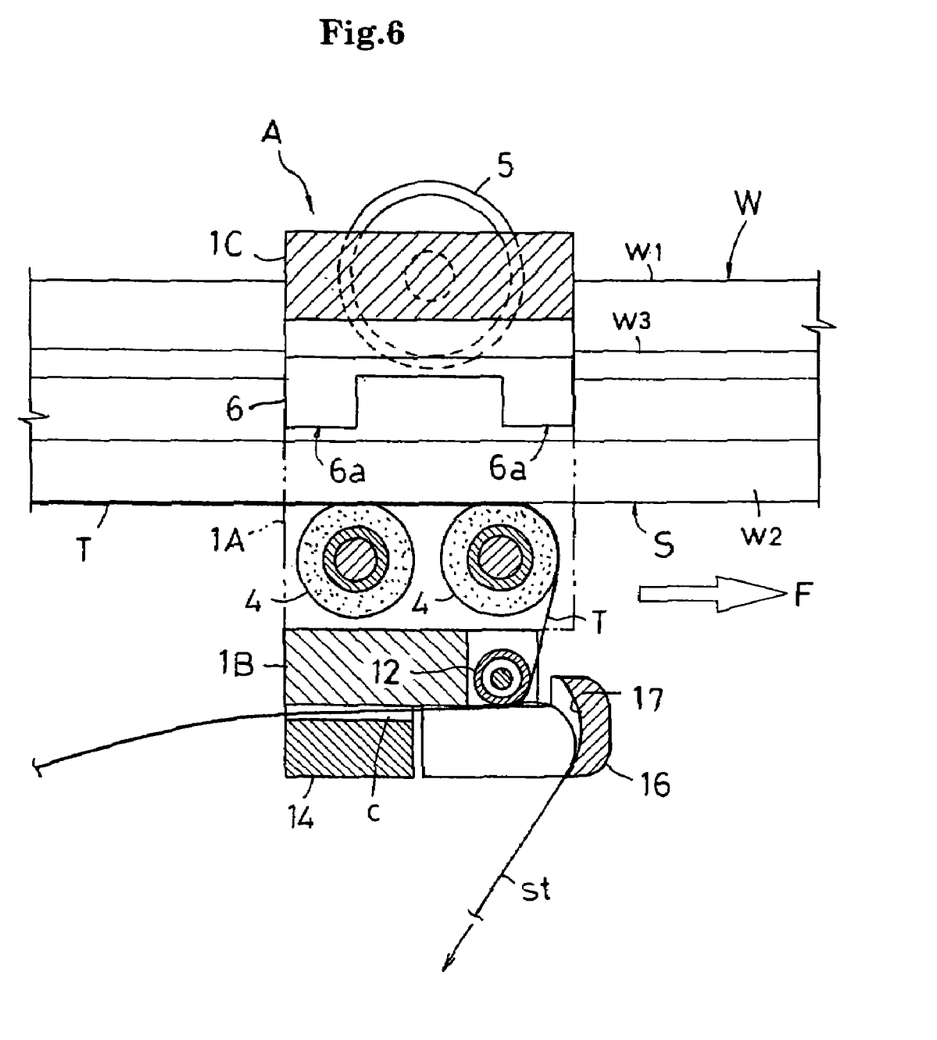
FIG. 6 is a sectional view taken along a line X-X in FIG. 5.

In addition, on the lower face at the front end side of the second bracket 1B, as shown in FIGS. 5 and 6, a platy tape guide 14 made of a hard resin material is attached to be fixed. Between this tape guide 14 and the lower face of the second bracket 1B, a tape insertion gap c released in a lateral direction is formed. In addition, the back end of the tape insertion gap c is formed at a tape positioning part 15. In other words, by accepting and supporting the one edge of the adhesive tape T inserted in the tape insertion gap c by the tape positioning part 15, the adhesive tape T is positioned in a width direction. Further, the tape guide 15 is attached so as to be positioned in the lateral direction, namely, in the tape width direction.

In addition, at the front side below the front end side in the second bracket 1B, a separator guide 16 made of a hard resin material is attached to be fixed. This separator guide 16 is arranged to be opposed to the tape supply roller 12 with an appropriate interval at the front position of the tape supply roller 12. In addition, the separator guide 16 is arranged to be slightly lower than the tape supply roller 12, and at its backward face, a separator guide face 17 that is concave-curved opposed to the tape supply roller 12 is formed. Further, this separator guide 16 is also attached in the lateral direction, namely, in the tape width direction so that its position can be adjusted.

The adhesive tape joining apparatus A according to the present invention is configured as described above. Next, using the apparatus A of the aforementioned embodiment, a step of joining the adhesive tape T to the workpiece W will be described.

At first, an operator raises the movable bracket 1C against the twisting spring 3, then, widening the space between the guide roller 5 and guide block 6, and the joining roller 4, the operator covers the lateral frame $w_2$ of the workpiece W with the movable bracket 1C. After that, adjusting the lateral position so as to sandwich the rib $w_3$ by the guide roller 5 and the guide block 6, the movable bracket 1C is biased and swung up to the limit. Then, the lateral frame $w_2$ is sandwiched from up and down directions by the guide roller 5, the guide block 6, and the joining roller 4. Further, by suppressing a lever part 1e of the movable bracket 1C with the operator's fingers supported by a protrusion part 1d elongated from the base of the second bracket 1B, the operator can raise and swing the movable bracket 1C by one hand.

Next, inserting the adhesive tape T with the separator through the tape insertion gap c so that the side with this separator st becomes the lower face, then, the separator st is separated from the front end of the adhesive tape T to expose the adhesive face. Guiding and winding the adhesive tape T having the adhesive face exposed at the upper side by the tape supply roller 12, this adhesive tape T is joined to a predetermined position of the joining face S in the workpiece W. In this case, the separator st separated from the adhesive tape T at the region of winding the tape of the tape supply roller 12 is guided on the separator guide face 17 of the separator guide 16 to be introduced downward.

After that, as shown in FIGS. 1 and 6, winding the adhesive tape T having the adhesive face exposed by the joining roller 4, the adhesive tape T is elastically pressed against the joining face S. By manually moving the adhesive tape joining apparatus A along the workpiece W to a front side F in this state, it is possible to continuously join the adhesive tape T on the tape joining face S positioning it in the width direction.

In this case, if the adhesive tape joining apparatus A is moved to the front side F, the adhesive tape T is moved relatively to the front side F, so that the separator st turns around to be guided on the separator guide face 17 of the separator guide 16 and then, the separator st is discharged into a direction separating from the joining roller 4. Accordingly, even in the case of joining the tape while moving the adhesive tape joining apparatus A upward or downward at a vertically long place of the workpiece W, so that it has been avoided in advance that the separated separator st is entangled in the adhesive tape T to come close the tape joining face S or to be an obstacle of the forward moving of the adhesive tape joining apparatus A.

Figure 7:
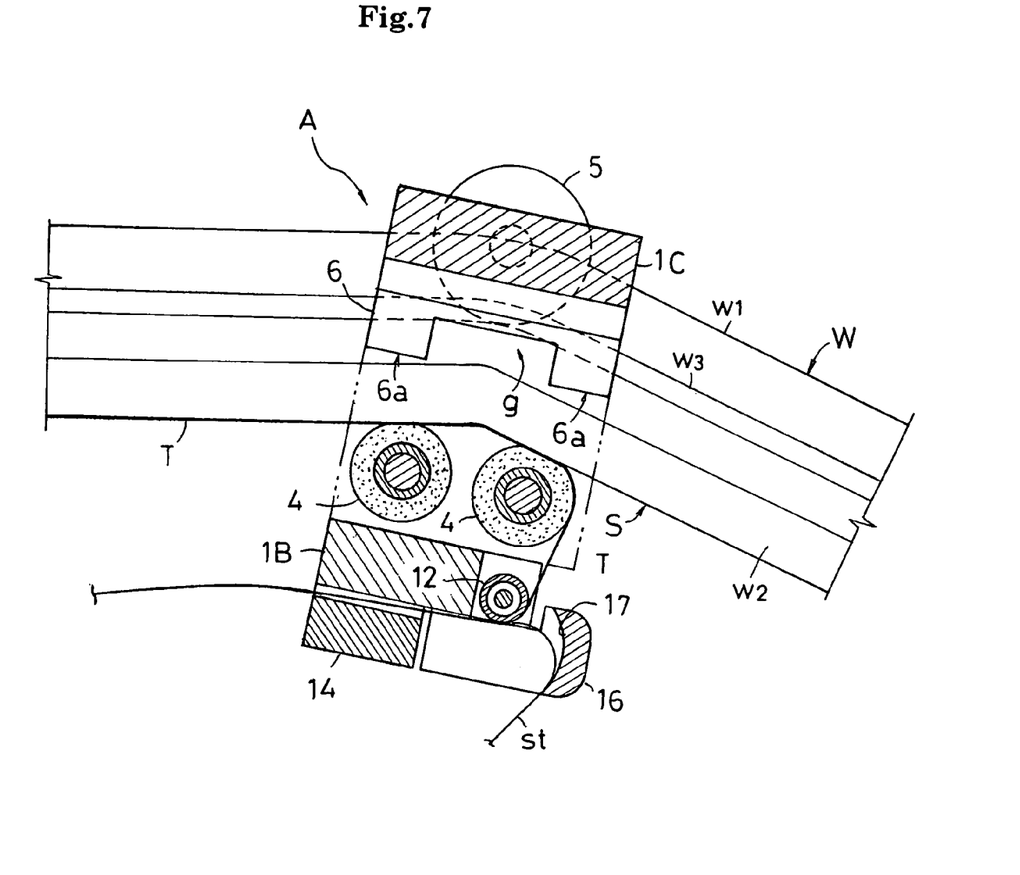
FIG. 7 is a longitudinal side view showing the joining processing state at a curved portion of a workpiece.

When the joining is progressed and the tape reaches a curved region b of the workpiece W, as shown in FIG. 7, the curved portion of the lateral frame $w_2$ enters a gap g between the back and forth sliding guide faces in the guide block 6. In this state, the adhesive tape joining apparatus A passes through the curved region smoothly and reasonably.

Further, the tape portion protruded from the tape joining face S is wound around the peripheral part of the lateral frame $w_2$ in the following step to be joined, and the appearance same as that applied with the coating processing is given.

In addition, with respect to the workpiece W of the different specification, it is possible to adjust the back and forth positions of the guide roller 5 and the upper and lower positions of the joining roller 6 according to need. Further, in accordance with change of the tape width, it is possible to adjust the positions of the tape guide 14 and the separator guide 16 in the lateral direction.

As described above, when joining the adhesive tape T on the inner face of the workpiece W, the adhesive tape joining apparatus A according to the present embodiment can put the curved portion of the lateral frame $w_2$ in the gap g between the back and forth sliding guide faces 6a in the divided pair of guide blocks 6 when this apparatus A reaches the curved region b of the workpiece W. As a result, it is possible to reasonably and smoothly join the adhesive tape on the curved region b. Therefore, it is possible to avoid that the adhesive tape T is stretched and the crease is generated at the curved region b of the workpiece W.

In addition, by configuring one member for sandwiching the workpiece W by the guide block 6 having the rectangular sliding face 6a, the contact area of the workpiece W is enlarged. As a result, as compared to the conventional apparatus that is moved along the workpiece W at a point contact in the case of sandwiching the workpiece W from up and down by the roller, the apparatus according to the present embodiment can be stably moved and operated. As a result, it is possible to join the adhesive tape T in a stable state.

The present invention is not limited to the aforementioned embodiment and it can be applied to a modification as follows.

Figure 8:
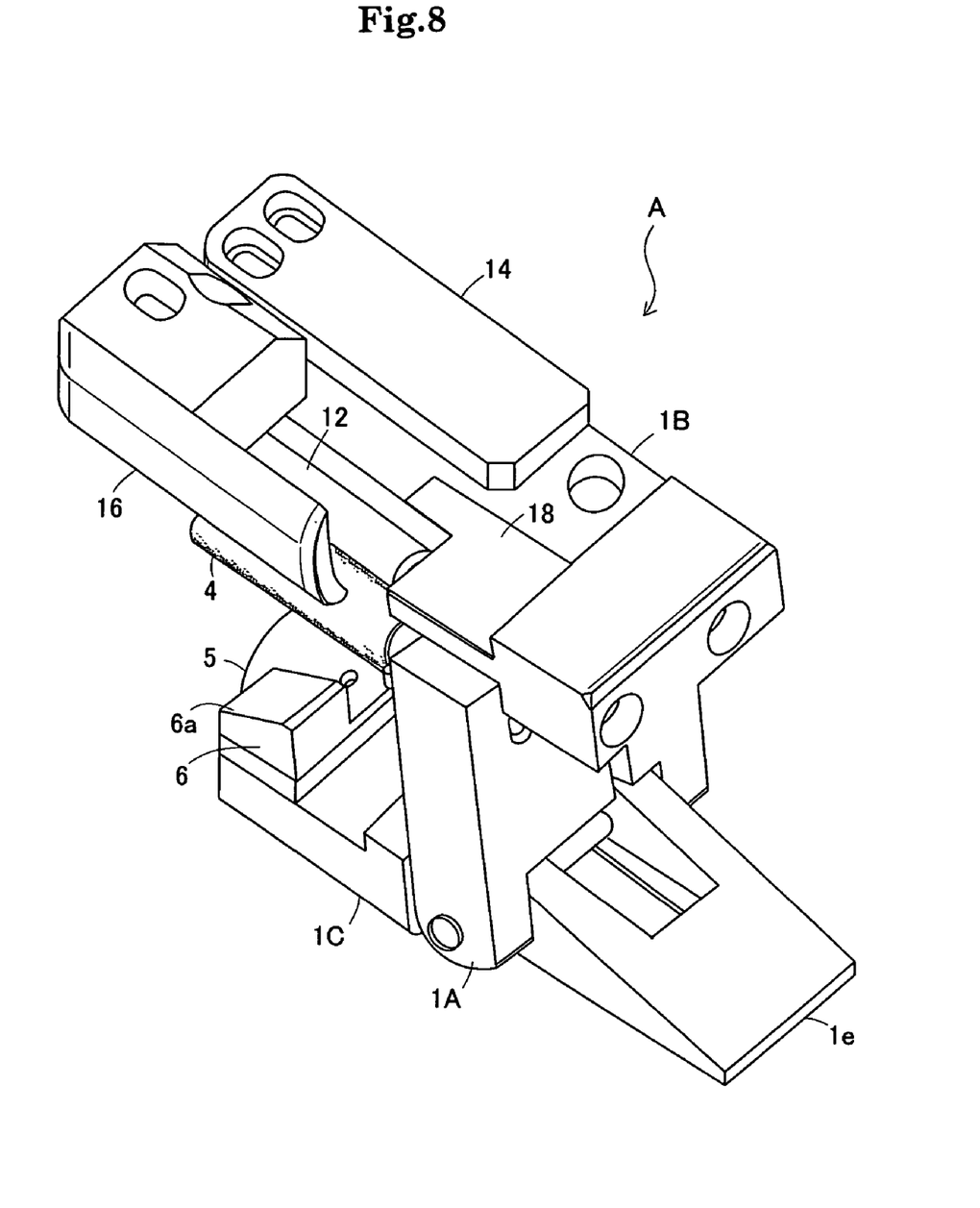
FIG. 8 is an outside perspective view at a rear face side of the adhesive tape joining apparatus according to a modification.
Figure 9:
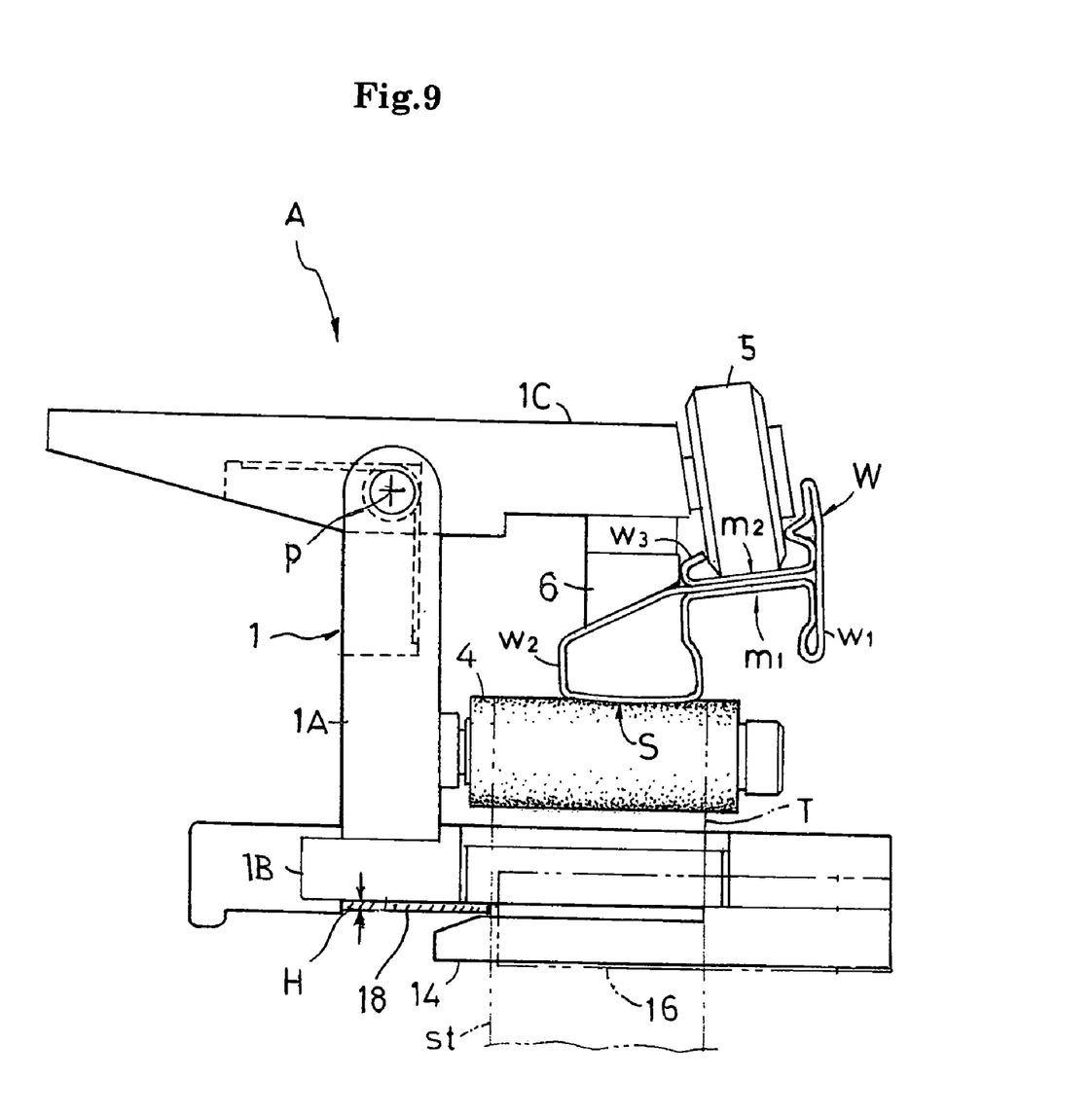
FIG. 9 is a front view of the adhesive tape joining apparatus according to the modification.
Figure 10:
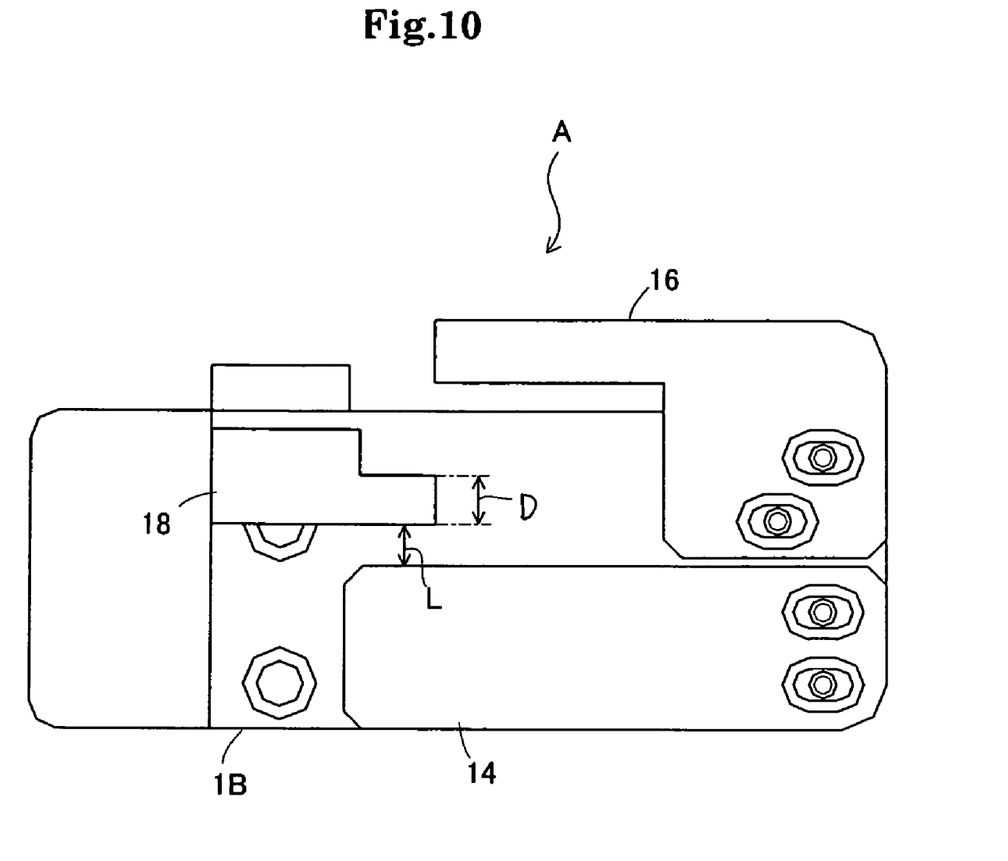
FIG. 10 is a bottom view of the adhesive tape joining apparatus according to the modification.

(1) In the apparatus according to the aforementioned embodiment, as shown in FIG. 8, a tape guide 18 for guiding running of the adhesive tape may be disposed to be opposed to the tape positioning part 15 so as to sandwich the width direction of the adhesive tape T in cooperation with the tape positioning part 15. As shown in FIGS. 9 and 10, this tape guide 18 is shaped in a plate and is attached and fixed to the rear face of the second bracket.

In a front view of the tape guide 18 seen from the rear face of the apparatus shown in FIG. 10, the tape guide 18 is attached at a predetermined distance L from the front side end in a direction of supplying a tape of the tape guide 14. This predetermined distance L is preferably 3 mm or more. In other words, by arranging the tape guide 18 at this predetermined distance L, attachment of the adhesive tape T to the tape guide 14 is not distracted upon attaching the tape.

In addition, a thickness H of the tape guide 18 is set to be more than the thickness of the adhesive tape T. According to the present embodiment, the thickness H is set to be 2 mm or less. Further, it is preferable that the width of the opposed portion W with the edge of the adhesive tape T is not more than 5 mm. If the width is 5 mm or less, when joining the adhesive tape T at the sharp curved portion, easily releasing the adhesive tape T running along the tape guide 18 from the guide, the rear part of the adhesive tape T can be made into a free state. In other words, the adhesive tape T can be easily treated.

Further, the tape guide 18 for guiding running is attached so that the setting of the tape guide 18 is changed depending on the width of the adhesive tape T.

Figure 11:
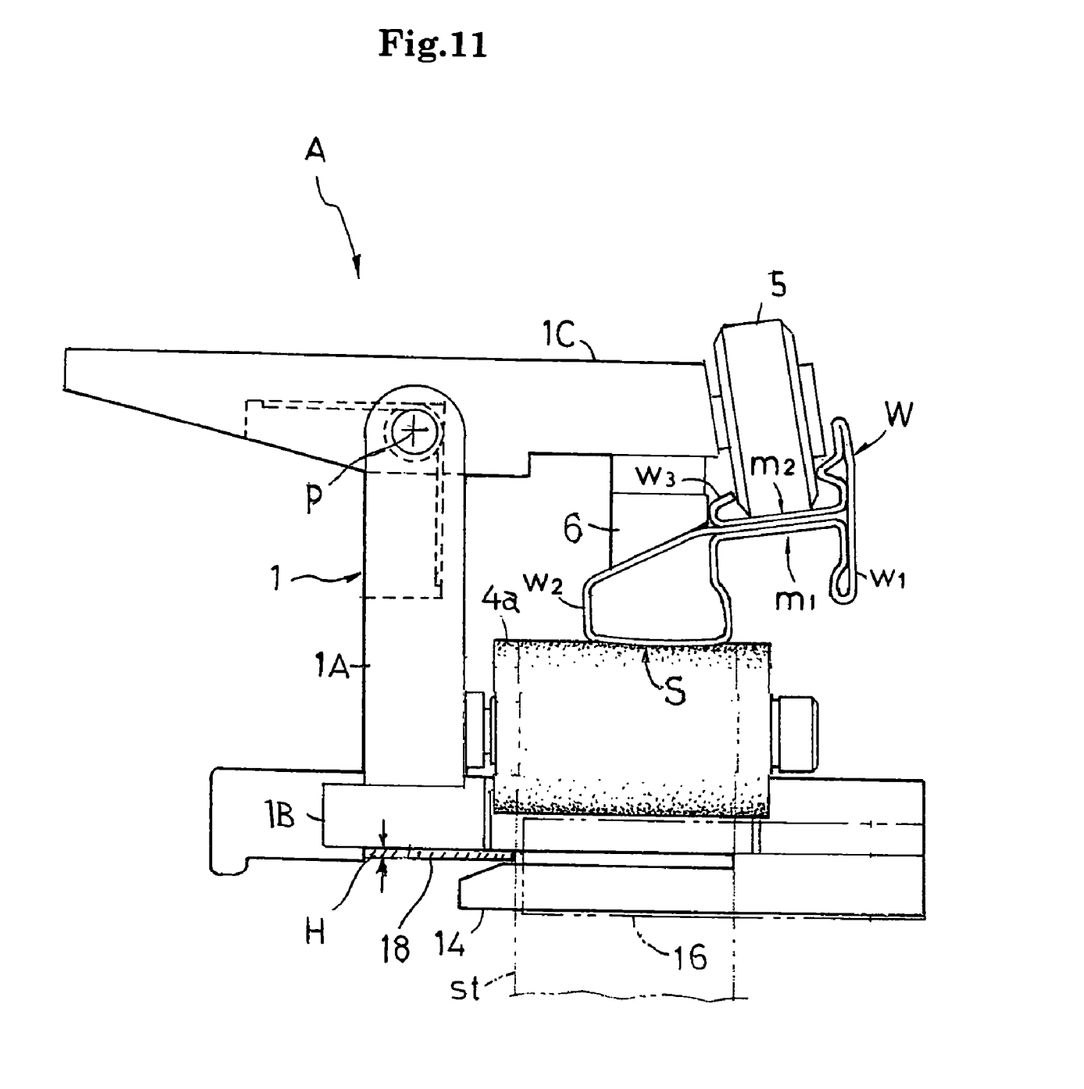
FIG. 11 is a front view of the adhesive tape joining apparatus according to the modification.
Figure 12:
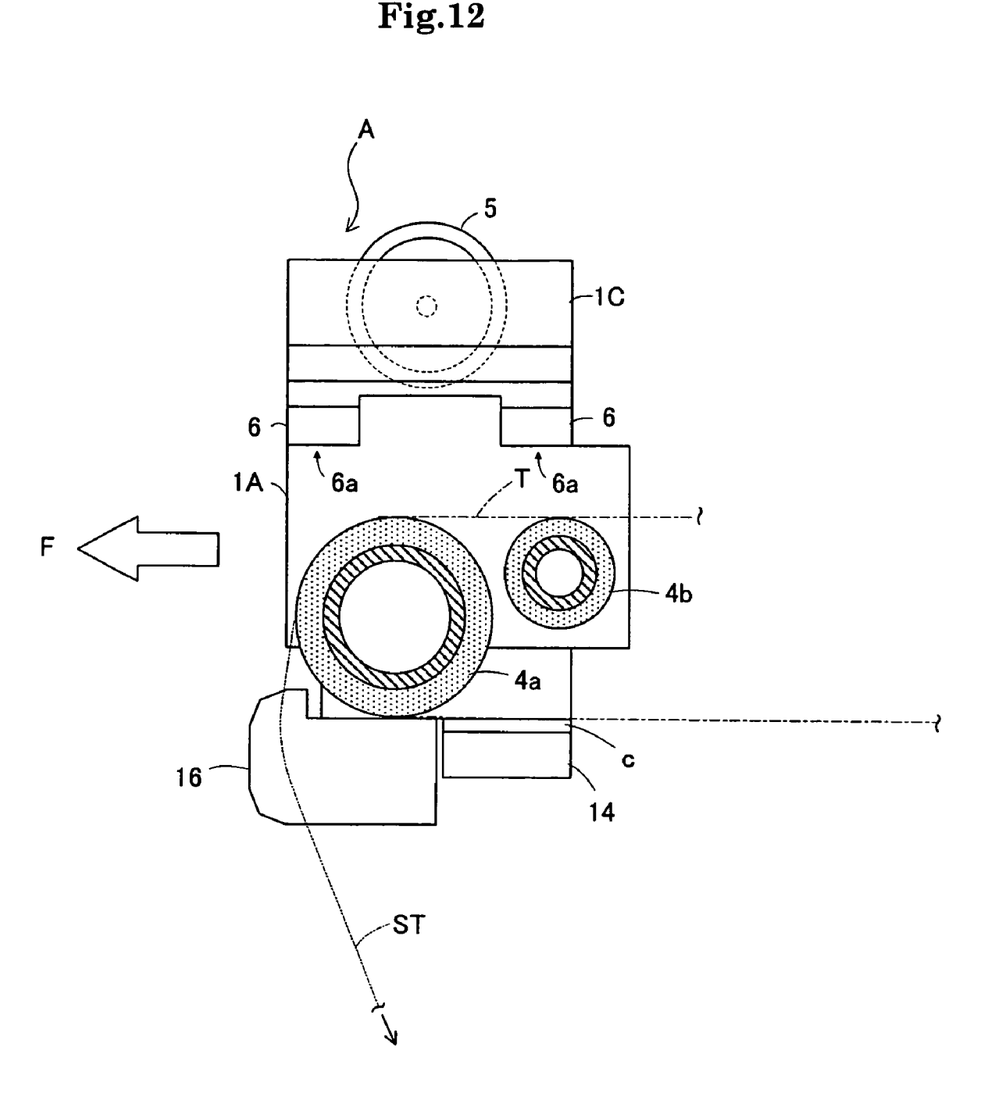
FIG. 12 is a plan view of the adhesive tape joining apparatus according to the modification.

(2) In the aforementioned embodiment, the adhesive tape T to be derived from the tape guide 14 is wound and guided to the joining roller 4 via the tape supply roller 12, however, the adhesive tape T may be configured as follows. In other words, as shown in FIGS. 11 and 12, a diameter of a joining roller 4a provided at the front side in the moving direction of this apparatus is set to be larger than the diameter of a joining roller 4b at the rear side.

According to this structure, during guidance of the adhesive tape T from the tape guide 14 to the joining roller 4a, this adhesive tape T is not affected due to loose caused by a rotation error of the tape supply roller 12 and the joining roller 4a or the like. In other words, it is possible to keep the tension on the adhesive tape T from the tape guide 14 to the joining roller 4a constant. As a result, the adhesive tape T can be stably joined on the workpiece W. In addition, since the running distance from the tape guide 14 to the joining roller 4a can be made shorter, it is possible to prevent adhesion of dust or the like to the adhesive tape T after the separator is separated.

Further, the diameter of the joining roller 4 at the front side of the apparatus according to the aforementioned embodiment provided with the tape supply roller 12 may be set to be larger than the diameter of the joining roller 4 at the rear side.

(3) According to the aforementioned embodiment, as two kinds of guide members to be engaged with the outer face of the workpiece W, a single guide roller 5 and the sliding guide faces 6a of the pair of back and forth guide blocks 6 are used. In place of this guide block 6, the pair of back and forth guide rollers with a small diameter can be also used.

(4) According to the aforementioned embodiment, the rib $w_3$ is sandwiched between the guide roller 5 and the guide block 6 from right and left and the positioning in the lateral direction of the apparatus is made. In place of this structure, by sliding the outer frame $w_1$ and the rib $w_3$ against the right and left side faces of the guide roller 5 engaged in the weather strip mounting groove $m^2$, the positioning in the lateral direction of the apparatus is also possible.

(5) According to the aforementioned embodiment, pivotally supporting the movable block 1C by the first bracket 1A to be capable of swinging, the apparatus is configured so that the guide roller 5 and the guide block 6 can approach, can be separated, and can move with respect to the joining roller 4, however, linearly and vertically sliding the movable bracket 1C, the movable bracket 1C may be slid and biased toward the joining roller 4 to be supported by the first bracket 1A.

(6) According to the aforementioned embodiment, the tape guide 14 and the separator guide 16 are separately formed, however, by integrally forming them, the number of the components can be reduced and the places to be adjusted can be reduced.

The present invention may be embodied in other specific forms without departing from the spirit or essential attributes thereof and, accordingly, reference should be made to the appended claims, rather than to the foregoing specification, as indicating the scope of the invention.

What is claimed is:

1. An adhesive tape joining apparatus which supplies an adhesive tape to a joining roller while moving forward along a workpiece and joins this adhesive tape on a tape joining face of the workpiece by pressing the adhesive tape against the tape joining face, the apparatus comprising:
   a main body that is moved and operated along the tape joining face of the workpiece;
   a joining roller which joins the supplied adhesive tape to the tape joining face of the workpiece by pressing the adhesive tape against the tape joining face and can be elastically transformed;
   a tape supply roller which winds and guides the adhesive tape and introduces the tape to the joining roller;
   a guide member which determines the position of the main body and keeps the posture of the main body with respect to the workpiece being engaged with the outer face of the workpiece at the opposite side of the tape joining face;
   a separator guide arranged to be opposed to the tape supply roller, on which a separator guide face for guiding the separator separated from the adhesive tape to a direction different from the direction of joining the adhesive tape at a region where the tape of the tape supply roller is wound; and
   a tape guide for preventing disengagement of the tape that is arranged adjacent to the side from which the adhesive tape is reeled out toward the separator guide.

2. The adhesive tape joining apparatus according to claim 1, wherein
   the guide member is supported so that the guide member can be held at a predetermined position with respect to the joining roller and can be separated and moved from the joining roller.

3. The adhesive tape joining apparatus according to claim 1, wherein
   the guide member is configured by two kinds of guide members that are engaged with the outer face of the workpiece across a rib protruded along the tape joining direction on the outer face of the workpiece.

4. The adhesive tape joining apparatus according to claim 3, wherein
   one of the two kinds of guide members is configured by a single guide roller that pivotally moves along the outer face of the workpiece, and
   the other guide member is configured by a guide block that slidably moves in a predetermined range on the outer face of the workpiece in the tape joining direction while contacting the predetermined range on the outer face of the workpiece.

5. The adhesive tape joining apparatus according to claim 4, wherein
   the guide block includes a pair of back and forth sliding guides which are divided in the tape joining direction.

6. The adhesive tape joining apparatus according to claim 5, wherein
   the joining roller further includes a pair of back and forth rollers, and
   respective joining rollers are arranged so as to be substantially opposed to each other on the faces of the pair of back and forth sliding guides provided to the guide block across the workpiece.

7. The adhesive tape joining apparatus according to claim 1, wherein
   the separator guide face is formed on a concave curved face moving to the tape supply roller.

8. The adhesive tape joining apparatus according to claim 1, wherein
   the separator guide is configured so that the movement can be adjusted in accordance with the width of the tape.

9. The adhesive tape joining apparatus according to claim 1, wherein
   the tape guide is configured so that the movement can be adjusted in accordance with the width of the tape.

10. The adhesive tape joining apparatus according to claim 1, further comprising:
    a tape guide for guiding running which is attached on the lower face of the main body, wherein a gap for inserting the adhesive tape is formed between the lower face of the main body and the guide with its one end released, the other end side is attached and fixed to the main body, and a positioning part slidably contacting one end of the adhesive tape in a longitudinal direction is formed at the back side of this other end, and
    the tape guide for guiding running is disposed at a position opposed to the positioning part so as to sandwich the adhesive tape from the width direction.

11. The adhesive tape joining apparatus according to claim 1, wherein
    the joining roller is configured by a pair of back and forth rollers, and the diameter of the roller at the front side in the moving direction is set to be larger than the diameter of the roller at the rear side.

12. An adhesive tape joining apparatus which supplies an adhesive tape to a joining roller while moving forward along a workpiece and joins this adhesive tape to a tape joining face of the workpiece by pressing the adhesive tape against the tape joining face, the apparatus comprising:
    a main body that is moved and operated along the tape joining face of the workpiece;
    a joining roller which winds and guides the adhesive tape to be supplied, joins the supplied adhesive tape to the tape joining face of the workpiece by pressing the adhesive tape against the tape joining face, and can be elastically transformed, wherein the diameter of the roller at the front side in the moving direction is larger than the diameter of the roller at the rear side;
    a guide member which determines the position of the main body and keeps the posture of the main body with respect to the workpiece being engaged with the outer face of the workpiece at the opposite side of the tape joining face;
    a separator guide arranged to be opposed to the tape supply roller, on which a separator guide face for guiding the separator separated from the adhesive tape to a direction different from the direction of joining the adhesive tape at a region where the tape of the tape supply roller is wound; and
    a tape guide for preventing disengagement of the tape that is arranged adjacent to the side from which the adhesive tape is reeled out toward the separator guide.

13. The adhesive tape joining apparatus according to claim 12, wherein
    the guide member is supported so that the guide member can be held at a predetermined position with respect to the joining roller and can be separated and moved from the joining roller.

14. The adhesive tape joining apparatus according to claim 12, wherein
    the guide member is configured by two kinds of guide members that are engaged with the outer face of the workpiece across a rib protruded along the tape joining direction on the outer face of the workpiece.

15. The adhesive tape joining apparatus according to claim 14, wherein
one of the two kinds of guide members is configured by a single guide roller that pivotally moves along the outer face of the workpiece, and
the other guide member is configured by a guide block that slidably moves in a predetermined range on the outer face of the workpiece in the tape joining direction while contacting the predetermined range on the outer face of the workpiece.

16. The adhesive tape joining apparatus according to claim 15, wherein
the guide block includes a pair of back and forth sliding guides which are divided in the tape joining direction.

17. The adhesive tape joining apparatus according to claim 12, wherein
the separator guide face is formed on a concave curved face moving to the tape supply roller.

18. The adhesive tape joining apparatus according to claim 12, wherein
the separator guide is configured so that the movement can be adjusted in accordance with the width of the tape.

19. The adhesive tape joining apparatus according to claim 12, wherein
the tape guide is configured so that the movement can be adjusted in accordance with the width of the tape.

20. The adhesive tape joining apparatus according to claim 12, further comprising:
a tape guide for guiding running which is attached on the lower face of the main body, wherein a gap for inserting the adhesive tape is formed between the lower face of the main body and the guide with its one end released, the other end side is attached and fixed to the main body, and a positioning part slidably contacting one end of the adhesive tape in a longitudinal direction is formed at the back side of this other end, and
the tape guide for guiding running is disposed at a position opposed to the positioning part so as to sandwich the adhesive tape from the width direction.

* * * * *